(12) United States Patent
Yamamoto et al.

(10) Patent No.: US 11,380,994 B2
(45) Date of Patent: Jul. 5, 2022

(54) COIL DEVICE AND ANTENNA

(71) Applicant: HITACHI METALS, LTD., Tokyo (JP)

(72) Inventors: Hiroki Yamamoto, Tokyo (JP); Tomoyuki Tada, Tokyo (JP); Satoru Tanaka, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 404 days.

(21) Appl. No.: 16/621,348

(22) PCT Filed: Jun. 7, 2018

(86) PCT No.: PCT/JP2018/021820
§ 371 (c)(1),
(2) Date: Dec. 11, 2019

(87) PCT Pub. No.: WO2018/230426
PCT Pub. Date: Dec. 20, 2018

(65) Prior Publication Data
US 2021/0143550 A1    May 13, 2021

(30) Foreign Application Priority Data
Jun. 13, 2017  (JP) .............................. JP2017-115701

(51) Int. Cl.
*H01Q 7/08*        (2006.01)
*H01F 1/34*        (2006.01)
(Continued)

(52) U.S. Cl.
CPC ............. *H01Q 7/08* (2013.01); *C04B 35/265* (2013.01); *H01F 1/344* (2013.01); *H01F 3/08* (2013.01);
(Continued)

(58) Field of Classification Search
CPC .......... H01Q 7/08; H01Q 9/04; H01Q 9/0442; H01F 1/34; H01F 1/344; H01F 5/00;
(Continued)

(56) References Cited

U.S. PATENT DOCUMENTS 5,484,491 A * 1/1996 Iwasaki ................... G11B 5/31
420/435
2005/0062576 A1   3/2005 Asakura et al.
(Continued)

FOREIGN PATENT DOCUMENTS

CN       101593869 A     12/2009
CN       101777697 A      7/2010
(Continued)

OTHER PUBLICATIONS

International Search Report for PCT/JP2018/021820 dated Sep. 11, 2018 (PCT/ISA/210).
(Continued)

*Primary Examiner* — Haissa Philogene
(74) *Attorney, Agent, or Firm* — Sughrue Mion, PLLC (57) ABSTRACT

A coil device comprising a coil, and a ferrite core arranged in a hollow portion of the coil, and a resin covering them; the ferrite core being a Ni ferrite core having initial permeability µi of 450 or more at a frequency of 100 kHz and a temperature of 20° C., and an average crystal grain size of 5-9 µm, both of temperature-dependent inductance change ratios TLa and TLb and stress-dependent inductance change ratios PLa and PLb being −0.6% to +0.6%, and both of the sum of TLa and PLa and the sum of TLb and PLb being more than −1.0% and less than +1.0%; and an antenna comprising it.

3 Claims, 4 Drawing Sheets

(51) Int. Cl.
*C04B 35/26* (2006.01)
*H01F 3/08* (2006.01)
*H01F 5/06* (2006.01)

(52) U.S. Cl.
CPC ........ *H01F 5/06* (2013.01); *C04B 2235/3274* (2013.01); *C04B 2235/3279* (2013.01); *C04B 2235/3281* (2013.01); *C04B 2235/3284* (2013.01); *C04B 2235/786* (2013.01)

(58) Field of Classification Search
CPC ........ H01F 5/06; H01F 17/045; H01F 27/255; H01F 27/027; C04B 35/265; C04B 2235/3274; C04B 2235/786; C04B 2235/5436; C04B 2235/3279; C04B 2235/3281; C04B 2235/3284
See application file for complete search history.

(56) References Cited

U.S. PATENT DOCUMENTS

| | | |
|---|---|---|
| 2010/0085140 A1 | 4/2010 | Tanaka et al. |
| 2010/0321140 A1 | 12/2010 | Tanaka et al. |
| 2011/0124183 A1* | 5/2011 | Yasumatsu .......... H01L 27/1218 438/479 |
| 2015/0228395 A1 | 8/2015 | Ochiai et al. |
| 2016/0145732 A1* | 5/2016 | Nakayama .............. C22C 38/06 148/319 |

FOREIGN PATENT DOCUMENTS

| | | |
|---|---|---|
| JP | 57-17110 A | 1/1982 |
| JP | 06-140229 A | 5/1994 |
| JP | 2005-097085 A | 4/2005 |
| JP | 2006-151702 A | 6/2006 |
| JP | 2006-282437 A | 10/2006 |
| JP | 4914448 B2 | 4/2012 |
| JP | 5841312 B2 | 1/2016 |

OTHER PUBLICATIONS

The Extended European Search Report dated Feb. 4, 2021, issued by the European Patent Office in application No. 18818308.1.
Communication dated Dec. 15, 2021 from the China National Intellectual Property Administration in English Application No. 201880038873.8.

* cited by examiner

# COIL DEVICE AND ANTENNA

CROSS REFERENCE TO RELATED APPLICATIONS

This application is a National Stage of International Application No. PCT/JP2018/021820 filed Jun. 7, 2018, claiming priority based on Japanese Patent Application No. 2017-115701 filed Jun. 13, 2017.

FIELD OF THE INVENTION

The present invention relates to a resin-molded coil device and an antenna comprising it, for example, to a coil device used in keyless entry systems using electronic keys, electronic theft protection apparatuses (immobilizers), and tire pressure-monitoring systems (TPMS) for automobiles, and an antenna.

BACKGROUND OF THE INVENTION

Under the requirement of higher convenience and safety, keyless entry systems, TPMS (tire pressure-monitoring systems), etc. have become widely used in intelligentized automobiles. In TPMS, for example, a sensor unit for measuring air pressure is attached to each tire mounted to a vehicle, to conduct wireless communications of vehicle-identifying information and drive/stop control information of the sensor unit, etc., between a control unit in the vehicle and an antenna in the air pressure sensor unit. The wireless communications are conducted using, for example, an LF wave having a frequency of 125 kHz as a carrier wave. The antenna may have a function of transmitting power for driving the circuit.

Figure 2:
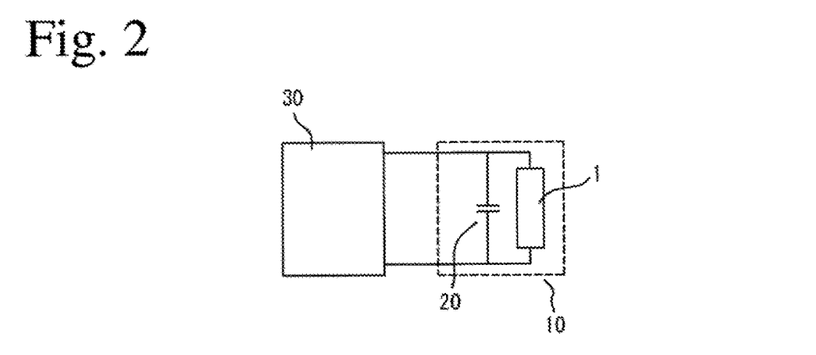
FIG. 2 is a view showing an LF antenna circuit comprising the coil device.

FIG. 2 shows an example of the structures of antenna circuits used in such systems. The antenna circuit has a parallel resonance circuit 10 comprising an antenna 1 and a capacitor 20 connected in parallel, a resonance frequency determined by the inductance of the antenna 1 and the capacitance of the capacitor 20 being set to be equal to the communication frequency of LF wave signals. The antenna 1 is connected to a control circuit 30. For example, an air pressure sensor unit receives signals from a control unit in the vehicle, the control circuit 30 judges whether or not the received signals are signals for operating the sensor unit, and the operation of the sensor unit is started according to the judgment.

Figure 1:
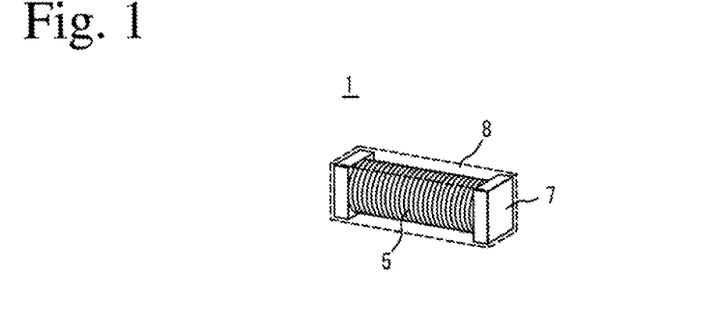
FIG. 1 is a perspective view showing an example of the coil devices of the present invention.

FIG. 1 shows an example of the structures of LF antennas used in antenna circuits. The antenna 1 is a coil device called resin-molded antenna, which comprises a coil 5, a ferrite core 7 arranged in a hollow portion of the coil 5, and an exterior portion 8 (shown by a dotted line) at least partially covering the coil 5 and the ferrite core 7. From the aspect of heat resistance, insulation resistance, moldability, etc., molding resins are thermosetting resins such as epoxy resins, etc., or thermoplastic resins such as liquid crystal polymers, etc.

Because ferrite materials forming the ferrite core have permeability variable with temperature and stress, the inductance of the resin-molded antenna likely changes by ambient temperature changes, causing discrepancy between the resonance frequency of a parallel resonance circuit and a communication frequency, resulting in failed communications or a reduced communication distance.

As measures for avoiding resonance frequency discrepancy due to the temperature characteristics of a ferrite material, there are methods of utilizing the temperature-dependent change of capacitance of a capacitor combined. For example, JP S57-17110 A discloses a method of using a Ni ferrite material having permeability decreasing as the temperature is elevated, for a ferrite core for electronic tuners such as car radios, etc.; and combining a capacitor constituting a parallel resonance circuit with a variable-capacitance diode having capacitance increasing as the temperature is elevated.

Though JP S57-17110 A discloses a method coping with resonance frequency discrepancy, it fails to take into consideration at all the stress characteristics of a ferrite material causing inductance change. Also, the permeability change of a ferrite core and the capacitance change of a capacitor depending on the temperature may not be linear, needing the selection of capacitors having performance and characteristics suitable for the purposes of use and adapted for the temperature characteristics of a ferrite material, among those available in the market. However, even the above combination may not be a sufficient measure, failing to suppress resonance frequency discrepancy sufficiently.

JP H6-140229 A discloses a resin-molded inductor, in which permeability change caused by stress generated between a ferrite core and a resin is corrected by using a ferrite material expressed by a $(Ni_{1-x}Cu_x)O \cdot bZnO \cdot cFe_2O_3$ having a negative temperature coefficient of permeability, wherein $x=0.1$-$0.8$, $a+b+c=100$, $b=0$-$35$ (including 0), and $c=32$-$48.5$, to reduce inductance change due to temperature change.

JP H6-140229 A corrects stress-caused permeability change by the temperature characteristics of a Ni ferrite material. However, because the influence of stress on permeability varies depending on the ferrite material, the adjustment of temperature characteristics changes the stress characteristics. Accordingly, simply using a ferrite material having a negative temperature coefficient of permeability may fail to reduce the inductance change due to temperature change.

SUMMARY OF THE INVENTION

An object of the present invention made in such circumstances is to provide an at least partially resin-coated coil device having suppressed temperature-dependent inductance change and stress-dependent inductance change, and suffering less inductance change in a wide temperature range, and an antenna comprising such a coil device.

The coil device of the present invention comprises a coil, and a ferrite core arranged in a magnetic path of the coil, at least part of which is coated with a resin;

the ferrite core being a Ni ferrite core having an average crystal grain size of 5-9 μm; and
the Ni ferrite core having
(a) initial permeability μi of 450 or more at a frequency of 100 kHz and a temperature of 20° C.,
(b) temperature-dependent inductance change ratios TLa and TLb of −0.6% to +0.6%, wherein TLa is represented by the formula 1 of $TLa=[(L_{T2}-L_{T1})/L_{T1}]\times 100(\%)$, and TLb is represented by the formula 2 of $TLb=[(L_{T3}-L_{T1})/L_{T1}]\times 100(\%)$, wherein $L_{T1}$ is inductance in a compression-free state at a frequency of 100 kHz and 20° C., $L_{T2}$ is inductance in a compression-free state at a frequency of 100 kHz and −40° C., and $L_{T3}$ is inductance in a compression-free state at a frequency of 100 kHz and 80° C., and
(c) stress-dependent inductance change ratios PLa and PLb of −0.6% to +0.6%, wherein PLa is represented by the formula 3 of $PLa=[(L_{P2}-L_{P1})/L_{P1}]\times 100(\%)$, and PLb is represented by the formula 4 of $PLb=[(L_{T1}-L_{P1})/L_{P1}]\times 100$ (%), wherein $L_{P1}$ is inductance when monoaxially compressed with a surface pressure of 10 MPa at a frequency of 100 kHz and 20° C., $L_{P2}$ is inductance when monoaxially compressed with a surface pressure of 20 MPa at a frequency of 100 kHz and 20° C., and $L_{T1}$ is inductance in a compression-free state at a frequency of 100 kHz and 20° C., (d) both of the sum of TLa and PLa and the sum of TLb and PLb being more than −1.0% and less than +1.0%.

The Ni ferrite core preferably has a composition comprising 47.5-48.4% by mol of $Fe_2O_3$, 25.0-30.5% by mol of ZnO, and 6.0-11.5% by mol of CuO, the balance being NiO and inevitable impurities.

The antenna of the present invention comprises the above coil device.

EFFECTS OF THE INVENTION

The present invention can provide a coil device having suppressed temperature-dependent inductance change and stress-dependent inductance change, and suffering less inductance change in a wide temperature range even under stress.

DESCRIPTION OF THE PREFERRED EMBODIMENTS

A resin-molded antenna will be specifically explained below as a coil device according to an embodiment of the present invention, though the present invention is not restricted thereto. It may be properly modified within the scope of its technical idea. In part or all of the figures, important portions are mainly shown for easiness of understanding the gist of the invention, with their details omitted.

Because the resin-molded antenna has the same structure as shown in FIG. 1, and because an antenna circuit comprising such antenna has the same structure as shown in FIG. 2, explanations will be made using them.

The resin-molded antenna comprises a ferrite core 7, a coil 5, and an exterior portion 8 covering and sealing them. The ferrite core 7 is made of a Ni ferrite material having initial permeability of 450 or more at a frequency of 100 kHz and a temperature of 20° C., and an average crystal grain size of 5-9 μm, both of temperature-dependent inductance change ratios TLa and TLb represented by the formulae 1 and 2, and stress-dependent inductance change ratios PLa and PLb represented by the formulae 3 and 4 being −0.6% to +0.6%, and both of the sum of TLa and PLa and the sum of TLb and PLb being more than −1.0% and less than +1.0%.

$$TLa=[(L_{T2}-L_{T1})/L_{T1}]\times100(\%), \quad \text{Formula 1}$$

$$TLb=[(L_{T3}-L_{T1})/L_{T1}]\times100(\%), \quad \text{Formula 2}$$

$$PLa=[(L_{P2}-L_{P1})/L_{P1}]\times100(\%), \quad \text{Formula 3 and}$$

$$PLb=[(L_{T1}-L_{P1})/L_{P1}]\times100(\%). \quad \text{Formula 4}$$

$L_{T1}$ is inductance in a compression-free state at a frequency of 100 kHz and 20° C., $L_{T2}$ is inductance in a compression-free state at a frequency of 100 kHz and −40° C., and $L_{T3}$ is inductance in a compression-free state at a frequency of 100 kHz and 80° C., $L_{P1}$ is inductance when monoaxially compressed with a surface pressure of 10 MPa at a frequency of 100 kHz and 20° C., and L is inductance when monoaxially compressed with a surface pressure of 20 MPa at a frequency of 100 kHz and 20° C.

The ferrite core 7 comprising a columnar or quadrangular-prism-shaped winding rod (bobbin) portion around which a coil is wound, and flanges at both ends thereof. Made of a Ni ferrite material, and limited by a space in which the antenna is mounted, the bobbin portion of the antenna mostly has a length of 7-16 mm, and a cross section of 1.2 mm×0.6 mm to 2.8 mm×2.5 mm. A conductor wire is wound around this ferrite core 7 by about 900 turns to form a coil 5 filling a space between the flanges. The conductor wire may be a polyurethane-coated or polyimide-coated wire. The ferrite core 7 and the coil 5 are coated with resins such as epoxy resins, etc. for sealing, to form the exterior portion 8 constituting a resin-molded antenna. Though not depicted, end portions of the coil may extend directly from the exterior portion 8, or may be connected to internal terminals (not shown) attached to the ferrite core by soldering, conductive adhesives, welding, etc. Further, external terminals of a leadframe (not shown) attached to the exterior portion may be connected to the above internal terminals for surface mounting.

The number of turns of a conductor wire wound around the ferrite core is properly set to obtain the desired inductance. For example, for TPMS, it is set to have inductance of 1 mH to 8 mH at 125 KHz. With the initial permeability of less than 450, the number of turns of a conductor wire is large to obtain the desired inductance, resulting in a large antenna. Also, the increased number of turns leads to increased stray capacitance generated among the conductor wire, resulting in a low self-resonance frequency. As the self-resonance frequency nears communications frequencies, the self-inductance of the coil increases, and the Q factor of the antenna decreases, likely resulting in deteriorated antenna functions, such as reduced communications distance, etc. Also, the inductance may become uneven at communications frequencies, failing to obtain a stable resonance frequency.

The ferrite core is a polycrystalline body of a Ni ferrite material. When the ferrite core has an average crystal grain size of less than 5 μm, it likely fails to have the desired initial permeability, and tends to have a pore-rich crystal structure with low strength. The average crystal grain size of more than 9 μm likely provides large temperature-dependent initial permeability change, failing to obtain the desired change ratio.

Used for the ferrite core in the resin-molded antenna is a Ni ferrite core having characteristics that all of temperature-dependent inductance change ratios TLa and TLb and stress-dependent inductance change ratios PLa and PLb are −0.6% to +0.6%, and that both of the sum of TLa and PLa and the sum of TLb and PLb are more than −1.0% and less than +1.0%. TLa, TLb, PLa and PLb are represented by the above formulae 1-4.

Figure 8:
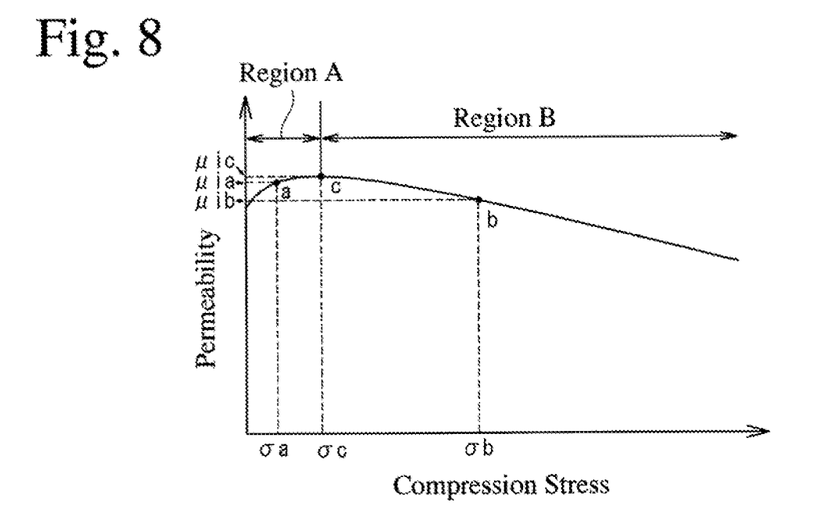
FIG. 8 is a schematic view for explaining the stress characteristics of the permeability of a Ni ferrite material.

FIG. 8 shows the relation between compression stress applied to the ferrite core and the initial permeability of the ferrite core. It is known that a ferrite material such as Ni ferrite having a negative magnetostriction constant generally has stress characteristics that its initial permeability increases and then decreases via the maximum value as the compression stress increases. The figure shows a region A under lower compression stress than providing the maximum initial permeability, in which the initial permeability increases as the compression stress increases, and a region B on the higher compression stress side, in which the initial permeability decreases as the compression stress increases.

It is considered that in the resin-molded antenna at a steady ambient temperature kept at room temperature, the ferrite core is subjected to stress in either one of regions A and B shown in FIG. 8. When stress applied to the ferrite core is σa at a point a in the region A, the initial permeability of the ferrite material becomes larger than μia as the compression stress increases. When stress is σb at a point b in the region B, the initial permeability becomes lower than μib as the compression stress increases. When stress is σc at a point c near the compression stress providing the maximum initial permeability, the initial permeability becomes lower than μic as the compression stress increases or decreases.

Figure 9:
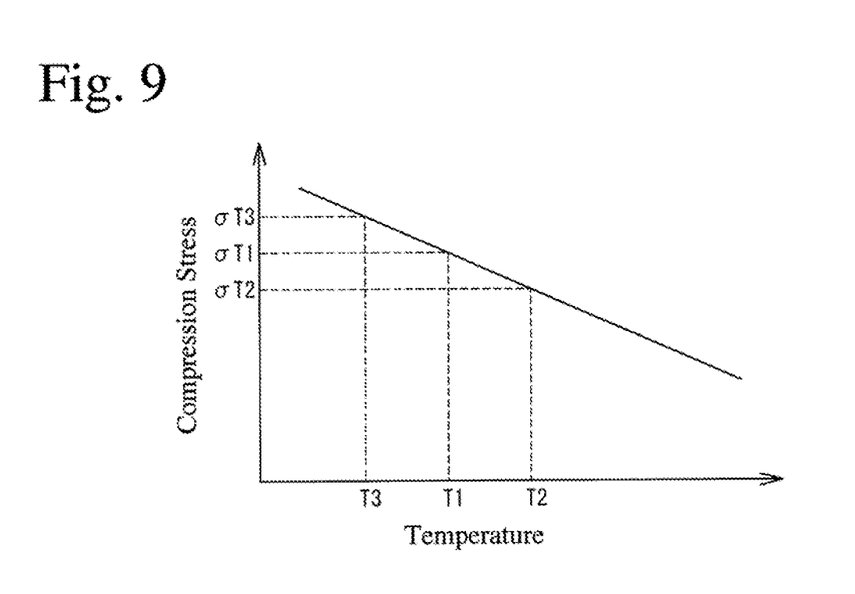
FIG. 9 is a schematic view showing the relation between stress applied to the resin-sealed ferrite core and temperature.

Resins used in the resin-molded antenna generally have larger linear thermal expansion coefficients than that of the ferrite material, so that stress applied to the ferrite core changes by temperature change. FIG. 9 shows an example of the relations between temperature and stress applied to the ferrite core. For example, stress σT1 applied to the ferrite core at a steady state T1 decreases to σT2 (stress −) when the resin-molded antenna is exposed to a high temperature environment T2 (temperature +), and increases to σT3 (stress +) when the resin-molded antenna is exposed to a low temperature environment T3 (temperature −), by the above linear thermal expansion coefficient difference.

The initial permeability of a ferrite material also changes by stress change due to such linear thermal expansion coefficient difference.

In an ideal state in which the temperature characteristics of permeability of a ferrite material need not to be considered, namely the initial permeability does not change by temperature change, the initial permeability of a ferrite material changes according to the stress changed caused by temperature change as follows:

For example, when the resin-molded antenna is used in a temperature environment that the ferrite core is in a temperature range from −40° C. to +80° C. under stress in the region A (point a), the stress decreases (stress −) as the temperature is elevated (temperature +) from the steady state as described above, decreasing the initial permeability (initial permeability −), while the stress increases (stress +) as the temperature is lowered (temperature −), increasing the initial permeability (initial permeability +).

When stress applied to the ferrite core is in the region B (point b), the stress decreases (stress −) as the temperature is elevated from the steady state (temperature +) as described above, increasing the initial permeability (initial permeability +), while the stress increases (stress +) as the temperature is lowered (temperature −), decreasing the initial permeability (initial permeability −).

When stress applied to the ferrite core is near stress providing the maximum initial permeability (point c), the initial permeability decreases (initial permeability −), regardless of whether the stress decreases (stress −) due to temperature elevation from the steady state (temperature +), or increases (stress +) due to temperature lowering (temperature −).

The initial permeability change in such ideal state differs when the temperature characteristics of a ferrite material are taken into consideration. Explanation will then be made on a ferrite core made of a Ni ferrite material having a negative temperature coefficient of permeability, by which the initial permeability decreases (initial permeability −) as the temperature is elevated (temperature +), as described in JP H6-140229 A.

When stress applied to the ferrite core is within the region A (point a), the stress decreases (stress −) as the temperature is elevated from the steady state (temperature +), further decreasing the initial permeability (initial permeability −) by the temperature characteristics of initial permeability. On the other hand, as the temperature is lowered (temperature −), the stress increases (stress +), further increasing the initial permeability (initial permeability +), resulting in large initial permeability change per temperature change.

When stress applied to the ferrite core is within the region B (point b), the change of initial permeability due to stress change is reduced, so that the initial permeability change is further smaller, regardless of whether the temperature is elevated or lowered from the steady state, than in the above ideal state in which the initial permeability does not change by temperature change (the temperature characteristics of permeability of a ferrite material need not be considered).

When stress applied to the ferrite core is near compression stress providing the maximum initial permeability (point c), the stress decreases (stress −) as the temperature is elevated from the steady state (temperature +), largely decreasing the initial permeability (initial permeability −) by the temperature characteristics of initial permeability. On the other hand, stress increase (stress +) due to temperature lowering (temperature −) makes the stress-dependent initial permeability change smaller than in the ideal state.

Such change of initial permeability is in accordance with the inductance change of a ferrite core. Thus, the method of JP 16-140229 A provides limited inductance change suppression, which is obtained only when stress applied to the ferrite core is within the region B in the steady state.

The inventors have found that to suppress the temperature-dependent inductance change, the temperature-dependent inductance change ratios TLa, TLb and the stress-dependent inductance change ratios PLa, PLb should be reduced from those in the steady state; and a sum of the inductance change ratio TLa at a lower temperature than in the steady state and the inductance change ratio PLa at higher stress than in the steady state, and a sum of the inductance change ratio TLb at a higher temperature than in the steady state and the inductance change ratio PLb at lower stress than in the steady state should also be reduced.

The inventors have further investigated to find that inductance change due to temperature change can be suppressed, when a Ni ferrite core having TLa, TLb, PLa and PLb all in a range of −0.6% to +0.6%, both of the sum of TLa and PLa and the sum of TLb and PLb being more than −1.0% and less than +1.0%, is used for a resin-molded antenna.

When PLa and PLb are less than −0.6% or more than +0.6% in the resin-molded antenna, the inductance change is more affected by the thickness and linear thermal expansion coefficient of a sealing resin. Also, when TLa+PLa and TLb+PLb are −1.0% or less or +1.0% or more, it tends to be difficult to suppress the temperature-dependent inductance change of the resin-molded antenna.

Figure 7:
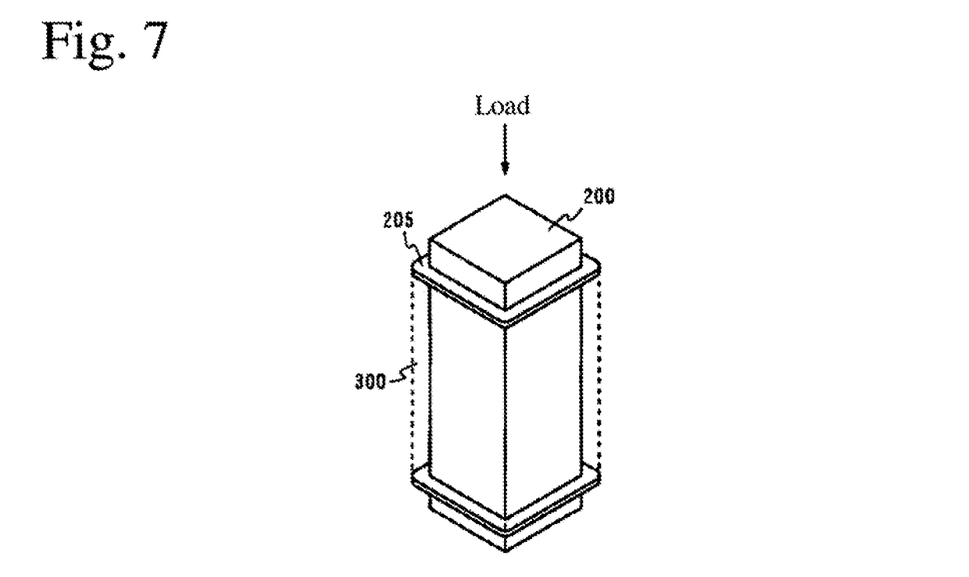
FIG. 7 is a schematic view showing a method for measuring a compression-stress-dependent inductance change ratio.

The measurement of inductances $L_{T1}$, $L_{T2}$, $L_{T3}$, $L_{P1}$ and $L_{P2}$ for determining TLa and TLb, temperature characteristics of inductance, and PLa and PLb, stress characteristics of inductance, is preferably conducted using a rod-shaped ferrite core sample having a rectangular cross section of 1.0 mm×0.5 mm to 2.8 mm×2.5 mm, and a length of 6 mm to 15 mm, depending on the size of a ferrite core bobbin portion around which a coil is wound. The number of winding is preferably 50 turns or more. FIG. 7 is a perspective view showing a sample used for the measurement. A measurement sample is constituted by arranging a ferrite core 200 in a hollow portion of a coil bobbin 205 around which a conductor wire 300 is wound by 60 turns.

Inductance $L_{T1}$ in a compression-free state at 20° C. is determined by measurement with current of a frequency of 100 kHz and 1 mA in a temperature environment of 20° C. The measurement of inductance uses an LCR meter (for example, 4284A available from Agilent Technologies). Inductance $L_{T2}$ in a compression-free state at −40° C. and inductance $L_{T3}$ in a compression-free state at 80° C. are measured in the same manner except that measurement samples are put in an electronic constant-temperature chamber at −40° C. and +80° C. The temperature dependence of inductance can also be measured by the same method at −40° C. to +80° C.

The stress dependence of inductance can be measured on a sample arranged in a simple compression jig with predetermined stress longitudinally applied to the ferrite core 200. For example, a ferrite core is sandwiched by a plate and a planar tip end portion of a force gauge, and the plate is moved up and down to apply a predetermined load to the ferrite core in the same direction as that of a magnetic flux generated in the ferrite core, to measure inductance with current of a frequency of 100 kHz and 1 mA at 20° C., like the inductance $L_{T1}$. Inductance $L_{P1}$ when monoaxially compressed with surface pressure of 10 MPa, and inductance $L_{P2}$ when monoaxially compressed with a surface pressure of 20 MPa are measured under surface pressure of 10 MPa and 20 MPa, respectively.

In the resin-molded antenna, the component composition of the Ni ferrite core preferably comprises 47.5-48.4% by mol of $Fe_2O_3$, 25.0-30.5% by mol of ZnO, and 6.0-11.5% by mol of CuO, the balance being NiO and inevitable impurities.

When $Fe_2O_3$ is less than 47.5% by mol, the desired initial permeability may not be obtained. On the other hand, when $Fe_2O_3$ is more than 48.4% by mol, the initial permeability change by temperature change is likely large. The amount of $Fe_2O_3$ is preferably 47.6% or more by mol, more preferably 47.8% or more by mol. It is also preferably 48.3% or less by mol, more preferably 48.2% or less by mol.

Less than 25.0% by mol of ZnO provides low initial permeability, failing to obtain the desired initial permeability. On the other hand, more ZnO lowers the Curie temperature (Tc). To achieve the Curie temperature of 130° C. or higher, ZnO is preferably 30.5% or less by mol. The amount of ZnO is preferably 25.1% or more by mol, more preferably 25.3% or more by mol. It is also preferably 30.4% or less by mol, more preferably 30.2% or less by mol.

Less than 6.0% by mol of CuO provides insufficient densification, making it difficult to obtain the desired initial permeability and to keep a crystal structure having an average particle size of 5-9 μm. On the other hand, when CuO is more than 11.5% by mol, excessive CuO accelerates sintering, making it difficult to keep the above crystal structure, and tending to provide large temperature-dependent initial permeability change. The amount of CuO is preferably 6.5% or more by mol, more preferably 7.0% or more by mol, most preferably 7.5% or more by mol. It is also preferably 11.0% or less by mol, more preferably 10.5% or less by mol, most preferably 10.0% or less by mol.

The balance are NiO and inevitable impurities.

1 part or less by mass of other components as inevitable impurities may be contained per 100 parts by mass in total of $Fe_2O_3$, ZnO, CuO and NiO. For example, 0.1 parts or less by mass of Ca calculated as CaO, and 0.1 parts or less by mass of Si calculated as $SiO_2$ may be contained. The amounts of Na, S, Cl, P, Mn, Cr, B, etc. are preferably as small as possible, and their industrially acceptable total amounts are 0.05 parts or less by mass.

As shown in FIG. 2, an antenna circuit having a resin-molded antenna comprising the coil device of the present invention comprises a capacitor 20 parallel-connected to the resin-molded antenna 1, which is connected to a control circuit 30. A resonance frequency determined by the inductance of the resin-molded antenna 1 and the capacitance of the capacitor 20 is set for a communications frequency. Because the temperature-dependent inductance change is suppressed by the present invention, the resonance frequency is stable, not deteriorating the communicating function of the antenna. Also, because consideration is not needed for the temperature-dependent inductance change, the capacitor has an improved degree of selection freedom.

EXAMPLES

The coil device of the present invention will be explained in further detail referring to the following Examples, without intention of restricting the present invention thereto.

(1) Production in Examples 1-8 and Comparative Examples 1-6

After weighing and dry-mixing were conducted to provide the after-sintering compositions of Fe, Zn, Cu and Ni calculated as oxides shown in Table 1, drying and calcining at 900° C. for 1 hour were conducted. Each of the resultant calcined powders was charged into a ball mill together with ion-exchanged water, and pulverized to an average particle size of 1.6 μm. The calcined powder mixed with polyvinyl alcohol was granulated by a spray drier method, molded, and then sintered at the temperature shown in Table 1 in air, to produce ring-shaped ferrite core samples of 25 mm in outer diameter, 15 mm in inner diameter and 5 mm in thickness, quadrangular-prism-shaped ferrite core samples of 2.0 mm×2.0 mm in cross section and 10 mm in length, and quadrangular-prism-shaped ferrite core samples of 1.8 mm×0.8 mm in cross section and 11 mm in length.

A 0.2-mm-diameter wire was wound by 850 turns around each quadrangular-prism-shaped ferrite core of 1.8 mm×0.8 mm in cross section and 11 mm in length, and sealed by a liquid crystal polymer to form coil devices of 4.0 mm×3.0 mm in cross section and 12 mm in length. In Comparative Examples 1 and 2, only the characteristics of the ferrite cores were measured, without forming the coil devices.

(2) Characteristics of Ferrite Core

A ring-shaped ferrite core samples was measured or calculated with respect to a sintering density, an average crystal grain size, initial permeability μi, and a relative temperature coefficient $\alpha_{\mu ir}$ of initial permeability μi. The measurement results are shown in Tables 1 and 2. The measurement and evaluation were conducted according to JIS C 2560-2, and the composition of the ferrite core was analyzed by X-ray fluorescence.

Sintering Density

The sintering density of a ring-shaped sample was measured and calculated by a water displacement method. The shape of the sample is not particularly restricted but may be in a quadrangular-prism or solid cylindrical shape, etc.

Average Crystal Grain Size

A photograph of a fractured cross section of a ring-shaped sample was taken by a scanning electron microscope (3000 times), and a rectangular region corresponding to an actual size of 32 μm×42 μm was taken from the photograph. Four arbitrary traversing lines each having a length L1 were drawn on the rectangular region, and the number N1 of grains on each line was counted and divided by the length L1 to obtain L1/N1, which was averaged for four lines to determine the average crystal grain size. Incidentally, the sample is not restricted to be in a ring shape, but may be in a quadrangular prism or solid cylindrical shape, etc.

Initial Permeability μi

With a conductor wire wound around a ring-shaped sample, the inductance was measured by an LCR meter (4284A available from Agilent Technologies) with current of a frequency of 100 kHz and 1 mA at 20° C. The initial permeability μi was determined from the measured inductance by the following formula:

$$\text{Initial permeability } \mu i = (le \times L)/(\mu_0 \times Ae \times N^2),$$

wherein le is the length (m) of a magnetic path, L is the inductance H of the sample, $\mu_0$ is permeability in vacuum=$4\pi\% \times 10^{-7}$ (H/m), Ae is the cross section area (m²) of a magnetic core, and N is the number of windings of a conductor wire.

Relative Temperature Coefficient % $\alpha_{\mu ir}$

The relative temperature coefficient $\alpha_{\mu ir}$ is defined by the formula of $\alpha_{\mu ir}=[(\mu i_2-\mu i_1)/\mu i_1^2]/(T_2-T_1)$, wherein $T_1$ and $T_2$ are measurement temperatures, $\mu i_1$ is initial permeability at a temperature $T_1$, and $\mu i_2$ is initial permeability at a temperature $T_2$.

For example, in the case of a relative temperature coefficient $\alpha_{\mu ir}$ in a temperature range from −40° C. to +20° C., $T_1$ is +20° C., $T_2$ is −40° C., $\mu i_1$ is initial permeability at +20° C., and $\mu i_2$ is initial permeability at −40° C. Also, in the case of a relative temperature coefficient $\alpha_{\mu ir}$ in a temperature range from +20° C. to +80° C., $T_1$ is +20° C., $T_2$ is +80° C., $\mu i_1$ is initial permeability at +20° C., and $\mu i_2$ is initial permeability at +80° C.

Dependence of Inductance on Temperature and Stress

Figure 3:
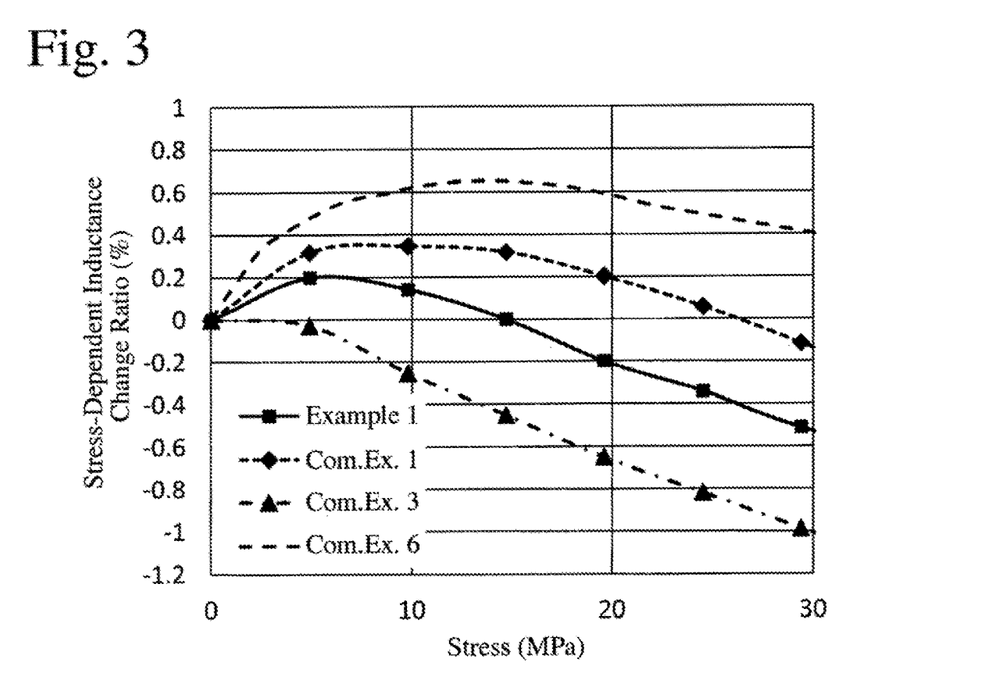
FIG. 3 is a graph showing the stress-dependent inductance change ratios in Example 1, and Comparative Examples 1, 3 and 6.
Figure 4:
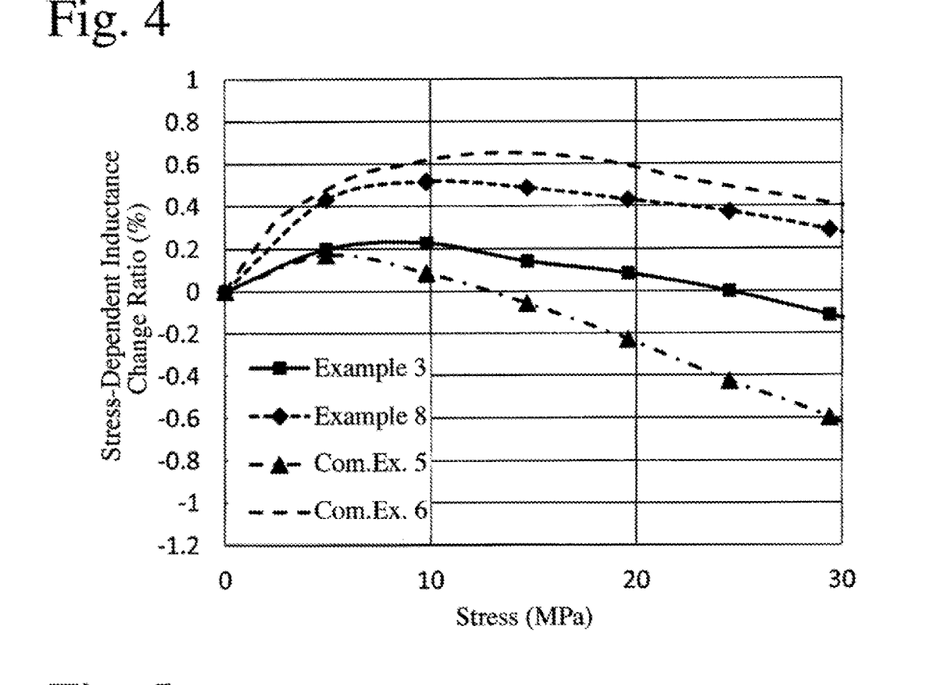
FIG. 4 is a graph showing the stress-dependent inductance change ratios in Examples 3 and 8, and Comparative Examples 5 and 6.
Figure 5:
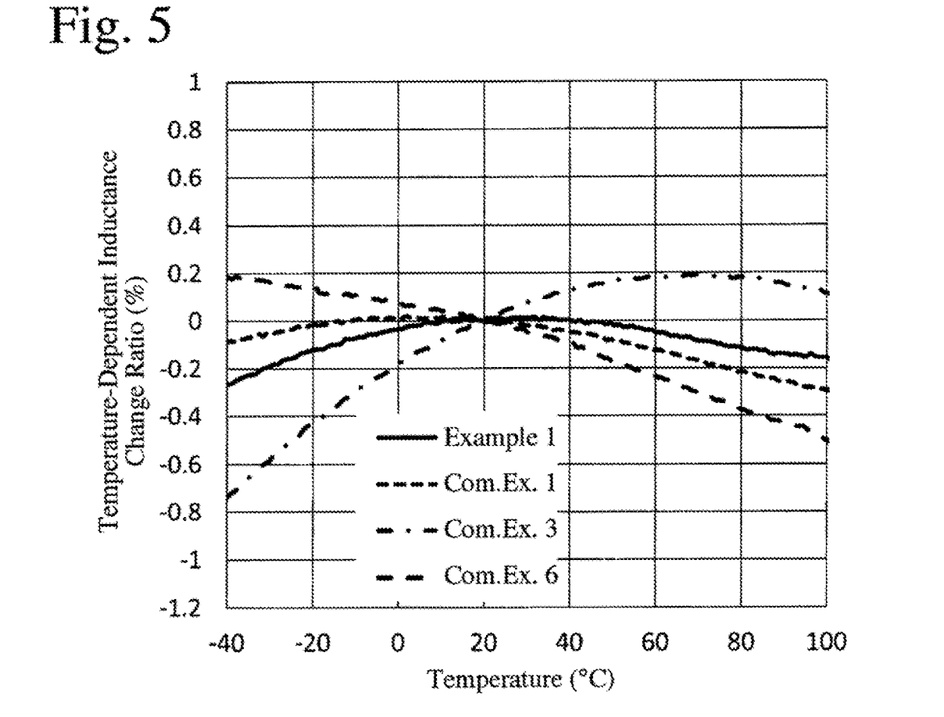
FIG. 5 is a graph showing the temperature-dependent inductance change ratios in Example 1, and Comparative Examples 1, 3 and 6.
Figure 6:
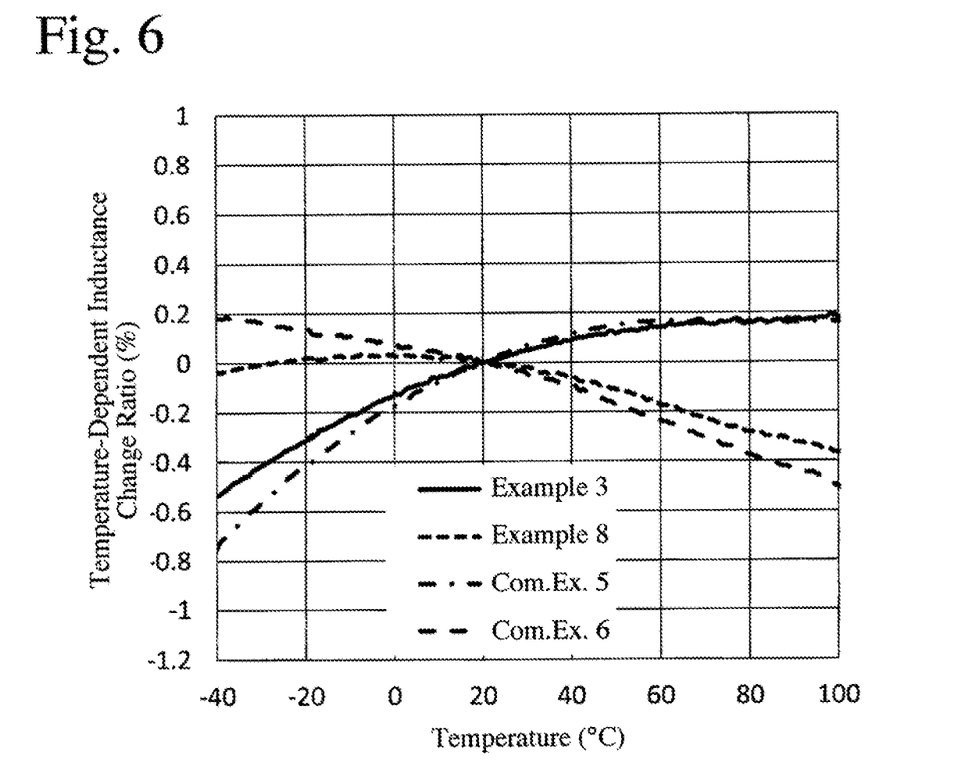
FIG. 6 is a graph showing the temperature-dependent inductance change ratios in Examples 3 and 8, and Comparative Examples 5 and 6.

Using a quadrangular-prism-shaped ferrite core sample of 2.0 mm×2.0 mm in cross section and 10 mm in length, the stress-dependent inductance change ratios PLa and PLb and the temperature-dependent inductance change ratios TLa and TLb were calculated as follows: The results are shown in Table 3. FIGS. 3 and 4 show the stress-dependent inductance change ratios, with a no-load state as a reference. FIGS. 5 and 6 show the temperature-dependent inductance change ratios, with a reference temperature of 20° C.

TLa, TLb, PLa and PLb were calculated by the following formulae 1-4:

$TLa=[(L_{T2}-L_{T1})/L_{T1}]\times 100(\%),$     Formula 1

$TLb=[(L_{T3}-L_{T1})/L_{T1}]\times 100(\%),$     Formula 2

$PLa=[(L_{P2}-L_{P1})/L_{P1}]\times 100(\%),$     Formula 3 and $PLb=[(L_{T1}-L_{P1})/L_{P1}]\times 100(\%),$     Formula 4 wherein $L_{T1}$ is inductance in a compression-free state at a frequency of 100 kHz and 20° C., $L_{T2}$ is inductance in a compression-free state at a frequency of 100 kHz and −40° C., $L_{T3}$ is inductance in a compression-free state at a frequency of 100 kHz and 80° C., $L_{P1}$ is inductance when monoaxially compressed with a surface pressure of 10 MPa at a frequency of 100 kHz and 20° C., and $L_{P2}$ is inductance when monoaxially compressed with a surface pressure of 20 MPa at a frequency of 100 kHz and 20° C.

The inductance $L_{T1}$ in a compression-free state at a frequency of 100 kHz and 20° C., the inductance $L_{T2}$ in a compression-free state at a frequency of 100 kHz and −40° C., the inductance $L_{T3}$ in a compression-free state at a frequency of 100 kHz and 80° C., the inductance $L_{P1}$ when monoaxially compressed with surface pressure of 10 MPa at a frequency of 100 kHz and 20° C., and the inductance $L_{P2}$ when monoaxially compressed with a surface pressure of 20 MPa at a frequency of 100 kHz and 20° C., which were used in each formula, were determined as follows.

A measurement sample was constituted by disposing a quadrangular-prism-shaped ferrite core 200 of 2.0 mm×2.0 mm and 10 mm in length in a hollow portion of a coil bobbin 205, around which a conductor wire 300 was wound by 60 turns, as shown in FIG. 7. The inductance $L_{T1}$ in a compression-free state was measured by an LCR meter (4284A available from Agilent Technologies) with current of a frequency of 100 kHz and 1 mA at a temperature environment of 20° C. The measurement sample was then put into an electronic constant-temperature chamber to measure inductance at −40° C. and +80° C., to determine inductance $L_{T2}$ in a compression-free state at −40° C., and inductance $L_{T3}$ in a compression-free state at 80° C. From the obtained results, TLa and TLb were calculated by the above formulae 1 and 2. The change ratios shown in FIGS. 5 and 6 were determined from inductance measured by the same method at −40° C. to +80° C.

The inductance in a compressed state was measured on a ferrite core 200 in the measurement sample produced by the same method, with predetermined stress applied longitudinally. The ferrite core was sandwiched by a plate and a planar tip end portion of a force gauge, and the plate was moved up and down to apply a predetermined load to the ferrite core in the same direction as that of a magnetic flux generated in the ferrite core (see FIG. 7). Under surface pressure conditions of 10 MPa and 20 MPa, with current of a frequency of 100 kHz and 1 mA at 20° C., the inductance $L_{P1}$ when monoaxially compressed with surface pressure of 10 MPa, and the inductance $L_{P2}$ when monoaxially compressed with a surface pressure of 20 MPa were measured. From the obtained inductance, PLa and PLb were calculated by the formulae 3 and 4. The change ratios shown in FIGS. 3 and 4 were determined from inductance measured by the same method at 0-29 MPa.

TABLE 1

| No. | Composition Fe$_2$O$_3$ (mol %) | ZnO (mol %) | NiO (mol %) | CuO (mol %) | Sintering Temperature (° C.) | Average Crystal Grain Size (μm) | Sintering Density (×10$^3$ kg/m$^3$) |
|---|---|---|---|---|---|---|---|
| Com. Ex. 1 | 48.1 | 29.5 | Bal. | 6.0 | 1000 | 2.6 | 5.10 |
| Com. Ex. 2 | 48.1 | 29.5 | Bal. | 6.0 | 1025 | 3.8 | 5.11 |
| Example 1 | 48.0 | 29.9 | Bal. | 9.8 | 1000 | 6.1 | 5.17 |
| Example 2 | 48.0 | 29.9 | Bal. | 9.8 | 1025 | 5.9 | 5.26 |
| Example 3 | 48.0 | 29.9 | Bal. | 9.8 | 1050 | 6.9 | 5.26 |
| Com. Ex. 3 | 48.0 | 30.0 | Bal. | 11.7 | 1000 | 9.9 | 5.23 |
| Com. Ex. 4 | 48.0 | 30.0 | Bal. | 11.7 | 1025 | 35.1 | 5.22 |
| Com. Ex. 5 | 48.0 | 30.0 | Bal. | 11.7 | 1050 | 31.5 | 5.23 |
| Example 4 | 48.4 | 29.8 | Bal. | 8.0 | 1100 | 8.2 | 5.24 |
| Example 5 | 48.1 | 30.0 | Bal. | 9.6 | 1100 | 8.7 | 5.23 |
| Example 6 | 48.0 | 29.9 | Bal. | 9.8 | 1100 | 8.8 | 5.22 |
| Com. Ex. 6 | 47.2 | 30.1 | Bal. | 8.0 | 1100 | 8.8 | 5.26 |
| Example 7 | 47.9 | 30.0 | Bal. | 9.5 | 1000 | 6.2 | 5.25 |
| Example 8 | 48.1 | 29.5 | Bal. | 6.0 | 1050 | 5.0 | 5.21 |

TABLE 2

| No. | Initial Permeability μi at 100 kHz and +20° C. | Relative Temperature Coefficient $\alpha_{\mu ir}^{(1)}$ (×10$^{-6}$) −40° C. to +20° C. | +20° C. to +80° C. |
|---|---|---|---|
| Com. Ex. 1 | 333 | 2.8 | −1.1 |
| Com. Ex. 2 | 417 | −0.6 | −2.8 |
| Example 1 | 577 | 0.8 | −1.6 |
| Example 2 | 561 | 1.2 | −1.0 |
| Example 3 | 759 | 5.2 | 2.7 |
| Com. Ex. 3 | 955 | 5.0 | 2.4 |
| Com. Ex. 4 | 719 | 5.6 | 2.8 |
| Com. Ex. 5 | 664 | 6.9 | 3.7 |
| Example 4 | 721 | 4.0 | 0.1 |
| Example 5 | 589 | 2.1 | −0.3 |
| Example 6 | 693 | 3.7 | 0.9 |
| Com. Ex. 6 | 416 | −2.3 | −2.8 |
| Example 7 | 575 | 0.7 | −1.6 |
| Example 8 | 467 | −0.9 | −3.0 |

Note:
$^{(1)}$Relative temperature coefficient $\alpha_{\mu ir} = [(\mu i_2 − \mu i_1)/\mu i_1^2]/(T_2 − T_1)$, wherein $T_1$ and $T_2$ are measurement temperatures, $\mu i_1$ is initial permeability at a temperature $T_1$, and $\mu i_2$ is initial permeability at temperature $T_2$.

TABLE 3

| No. | Inductance Change Ratio (%) TLa$^{(1)}$ | TLb$^{(1)}$ | PLa$^{(1)}$ | PLb$^{(1)}$ | TLa + PLa | TLb + PLb |
|---|---|---|---|---|---|---|
| Com. Ex. 1 | −0.09 | −0.22 | −0.14 | −0.34 | −0.23 | −0.56 |
| Com. Ex. 2 | 0.05 | −0.42 | −0.11 | −0.46 | −0.06 | −0.88 |
| Example 1 | −0.15 | −0.12 | −0.34 | −0.14 | −0.49 | −0.26 |
| Example 2 | −0.36 | −0.08 | −0.23 | −0.11 | −0.59 | −0.19 |
| Example 3 | −0.53 | 0.16 | −0.14 | −0.23 | −0.67 | −0.07 |
| Com. Ex. 3 | −0.74 | 0.18 | −0.40 | 0.25 | −1.14 | 0.43 |
| Com. Ex. 4 | −0.74 | 0.18 | −0.43 | 0.14 | −1.17 | 0.32 |
| Com. Ex. 5 | −0.75 | 0.16 | −0.31 | −0.09 | −1.06 | 0.07 |
| Example 4 | −0.57 | −0.03 | −0.22 | −0.06 | −0.79 | −0.09 |
| Example 5 | −0.24 | 0.07 | −0.11 | −0.35 | −0.35 | −0.28 |
| Example 6 | −0.47 | −0.01 | −0.14 | −0.17 | −0.61 | −0.18 |
| Com. Ex. 6 | 0.19 | −0.38 | −0.03 | −0.62 | 0.16 | −1.00 |
| Example 7 | −0.21 | −0.14 | −0.24 | −0.18 | −0.45 | −0.32 |
| Example 8 | −0.03 | −0.28 | −0.09 | −0.51 | −0.12 | −0.79 |

Note:
$^{(1)}$TLa = $[(L_{T2} − L_{T1})/L_{T1}] \times 100$ (%), TLb = $[(L_{T3} − L_{T1})/L_{T1}] \times 100$ (%), PLa = $[(L_{P2} − L_{P1})/L_{P1}] \times 100$ (%), and PLb = $[(L_{T1} − L_{P1})/L_{P1}] \times 100$ (%), wherein $L_{T1}$ is inductance in a compression-free state at a frequency of 100 kHz and 20° C., $L_{T2}$ is inductance in a compression-free state at a frequency of 100 kHz and −40° C., $L_{T3}$ is inductance in a compression-free state at a frequency of 100 kHz and 80° C., $L_{P1}$ is inductance when monoaxially compressed with a surface pressure of 10 MPa at a frequency of 100 kHz and 20° C., and $L_{P2}$ is inductance when monoaxially compressed with a surface pressure of 20 MPa at a frequency of 100 kHz and 20° C.

Any ferrite core in Examples 1-8 had initial permeability of 450 or more, both of the temperature-dependent inductance change ratios TLa and TLb, and both of the stress-dependent inductance change ratios PLa and PLb being −0.6% to +0.6%, and both of the sum of TLa and PLa and the sum of TLb and PLb being more than −1.0% and less than +1.0%. TLa was negative in all Examples. As shown in FIGS. 3 and 4, the stress providing the maximum inductance change ratio was 10 MPa or less.

On the other hand, because the amount of Cu was as small as 6.0% by mol despite a small inductance change ratio in Comparative Example 1, crystal grains were not densified at a sintering temperature of 1000° C., resulting in an average crystal grain size of less than 5 μm and as low initial permeability as 333. Like Comparative Example 1, Comparative Example 2 suffered a low sintering density and as low initial permeability as 417. Comparative Examples 3-5 having more than 11.5% by mol of CuO exhibited initial permeabilities of 450 or more, and average crystal grain sizes of 9 μm or more, their temperature-dependent inductance change ratios TLa being less than −0.6%, and the sum of TLa and stress change-dependent inductance PLa (TLa+PLa) being −1.0% or less. Comparative Example 6 having less than 47.5% by mol of Fe$_2$O$_3$ exhibited initial permeability of less than 450, and a stress-dependent inductance change ratio PLb of less than −0.6%, the sum of a temperature-dependent inductance change ratio TLb and PLb (TLb+PLb) being −1.0% or less. As shown in FIGS. 3 and 4, the stress providing the maximum inductance change ratio was near 15 MPa. Also, as shown in FIGS. 5 and 6, it exhibited a negative temperature-dependent change ratio, with a reference temperature of 20° C.

(3) Evaluation of Coil Device

The inductance of each coil device in Examples 1-8 and Comparative Examples 3-6 was measured by an LCR meter (4284A available from Agilent Technologies) with current of a frequency of 100 kHz and 1 mA, at temperatures of −40° C., +20° C. and +80° C.

From the measured results, inductance change ratios in temperature ranges from +20° C. to −40° C. and +80° C. were calculated by the following formula:

$$\Delta L(T_2)=[(L_2-L_1)/L_1]/(T_2-T_1)\times 100(\%),$$

wherein $T_1$ is +20° C., $T_2$ is −40° C. or +80° C., $L_1$ is inductance at a temperature $T_1$, and $L_2$ is inductance at a temperature $T_2$.

The coil device of Example 1 had an inductance change ratio $\Delta L(-40)$ of −0.72% when $T_2=-40°$ C., an inductance change ratio $\Delta L(+80)$ of −0.65% when $T_2=+80°$ C., both in a range from −1.0% to +1.0%. Any coil device of Examples 2-8 had an inductance change ratio $\Delta L(-40)$ when $T_2=-40°$ C. and an inductance change ratio $\Delta L(+80)$ when $T_2=+80°$ C., both in a range from −1.0% to +1.0%, exhibiting suppressed temperature-dependent inductance change.

The coil device of Comparative Example 6 had an inductance change ratio $\Delta L(-40)$ of +0.65% when $T_2=-40°$ C., and an inductance change ratio $\Delta L(+80)$ of −1.95% when $T_2=+80°$ C. Any coil device of Comparative Examples 3-5 had an inductance change ratio $\Delta L(-40)$ when $T_2=-40°$ C. and an inductance change ratio $\Delta L(+80)$ when $T_2=+80°$ C., either one of which was outside the range of −1.0% to +1.0%, exhibiting large temperature-dependent inductance change.

What is claimed is:

1. A coil device comprising a coil, and a ferrite core arranged in a magnetic path of the coil, at least part of which is coated with a resin;

said ferrite core being a Ni ferrite core having an average crystal grain size of 5-9 μm; and said Ni ferrite core having (a) initial permeability μi of 450 or more at a frequency of 100 kHz and a temperature of 20° C., (b) temperature-dependent inductance change ratios TLa and TLb of −0.6% to +0.6%, wherein TLa is represented by the formula 1 of TLa=[$(L_{T2}-L_{T1})/L_{T1}$]×100(%), and TLb is represented by the formula 2 of TLb=[$(L_{T3}-L_{T1})/L_{T1}$]×100 (%), wherein $L_{T1}$ is inductance in a compression-free state at a frequency of 100 kHz and 20° C., $L_{T2}$ is inductance in a compression-free state at a frequency of 100 kHz and −40° C., and $L_{T3}$ is inductance in a compression-free state at a frequency of 100 kHz and 80° C., and (c) stress-dependent inductance change ratios PLa and PLb of −0.6% to +0.6%, wherein PLa is represented by the formula 3 of PLa=[$(L_{P2}-L_{P1})/L_{P1}$]×100(%), and PLb is represented by the formula 4 of PLb=[$(L_{T1}-L_{P1})/L_{P1}$]×100 (%), wherein $L_{P1}$ is inductance when monoaxially compressed with a surface pressure of 10 MPa at a frequency of 100 kHz and 20° C., $L_{P2}$ is inductance when monoaxially compressed with a surface pressure of 20 MPa at a frequency of 100 kHz and 20° C., and $L_{T1}$ is inductance in a compression-free state at a frequency of 100 kHz and 20° C., (d) both of the sum of TLa and PLa and the sum of TLb and PLb being more than −1.0% and less than +1.0%.

2. The coil device according to claim 1, wherein said Ni ferrite core has a composition comprising 47.5-48.4% by mol of $Fe_2O_3$, 25.0-30.5% by mol of ZnO, and 6.0-11.5% by mol of CuO, the balance being NiO and inevitable impurities.

3. An antenna comprising the coil device recited in claim 1.

* * * * *